(12) United States Patent
Gorev

(10) Patent No.: US 8,570,326 B2
(45) Date of Patent: Oct. 29, 2013

(54) RULE BASED VISUALIZATION MECHANISM

(75) Inventor: Alexandre Gorev, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 12/616,123

(22) Filed: Nov. 10, 2009

(65) Prior Publication Data

US 2011/0109632 A1 May 12, 2011

(51) Int. Cl.
*G06T 11/20* (2006.01)
(52) U.S. Cl.
USPC .......................................... 345/440; 345/629
(58) Field of Classification Search
USPC ................................ 345/440, 629
See application file for complete search history.

(56) References Cited

U.S. PATENT DOCUMENTS

| | | | | |
|---|---|---|---|---|
| 5,572,639 | A * | 11/1996 | Gantt | 345/651 |
| 5,988,853 | A * | 11/1999 | Kim et al. | 700/90 |
| 6,091,424 | A * | 7/2000 | Madden et al. | 345/619 |
| 6,154,219 | A * | 11/2000 | Wiley et al. | 345/587 |
| 6,565,610 | B1 * | 5/2003 | Wang et al. | 715/210 |
| 6,801,201 | B2 | 10/2004 | Escher | |
| 6,907,404 | B1 | 6/2005 | Li | |
| 6,940,530 | B2 * | 9/2005 | Chen et al. | 345/660 |
| 7,036,081 | B2 | 4/2006 | Powlette | |
| 7,057,928 | B2 * | 6/2006 | Johnson et al. | 365/185.01 |
| 7,131,060 | B1 * | 10/2006 | Azuma | 715/260 |
| 7,425,968 | B2 * | 9/2008 | Gelber | 345/629 |
| 7,469,226 | B2 | 12/2008 | Escher | |
| 7,542,934 | B2 | 6/2009 | Markel | |
| 7,567,927 | B2 | 7/2009 | Boglaev | |
| 2003/0009411 | A1 * | 1/2003 | Ram et al. | 705/37 |
| 2003/0139957 | A1 | 7/2003 | Satchwell | |
| 2004/0252137 | A1 * | 12/2004 | Gelber | 345/629 |
| 2008/0036787 | A1 * | 2/2008 | Gelber | 345/619 |
| 2008/0136838 | A1 * | 6/2008 | Goede et al. | 345/619 |
| 2008/0163091 | A1 * | 7/2008 | Busse | 715/771 |
| 2009/0024411 | A1 | 1/2009 | Albro et al. | |
| 2009/0217150 | A1 | 8/2009 | Lin | |

OTHER PUBLICATIONS

Ciccarese, et al., "A Framework for Temporal Data Processing and Abstractions", Retrieved at <<http://www.pubmedcentral.nih.gov/picrender.fcgi?artid=1839476&blobtype=pdf>>, AMIA Annu Symp Proc. 2006, pp. 146-150.

* cited by examiner

*Primary Examiner* — M Good Johnson
(74) *Attorney, Agent, or Firm* — Rau Patents, LLC

(57) ABSTRACT

A visualization mechanism may use two sets of rules having different priorities to generate points of interest for a dataset, and display the dataset with labels for the points of interest. The first set of rules may identify and label points of interest by various mechanisms, including analysis of the dataset and comparison to other datasets. The second set of rules may de-clutter the points interest by filtering and aggregating the points of interest by various mechanisms including the priority of the rule that created the point of interest. A display generator may create the visualization of the dataset along with various labels. In some embodiments, the display generator may allow real time user interaction with the data, which may include resizing the visualization in which the filtering and aggregation may be re-applied.

20 Claims, 5 Drawing Sheets

RULE BASED VISUALIZATION MECHANISM

BACKGROUND

Numerical and other data are often displayed on charts and graphs, and in many cases labels or other annotations may be used to display critical inflections or other information that may be drawn from the illustration. In many cases, the analysis of the data may be performed manually or may be automated to some extent.

The tools for automating data analysis and generating labels for charts or graphs have been crude at best. Many automated tools that may provide labels for charts or graphs may either create very cluttered graphs or are difficult to extend or modify.

SUMMARY

A visualization mechanism may use two sets of rules having different priorities to generate points of interest for a dataset, and display the dataset with labels for the points of interest. The first set of rules may identify and label points of interest by various mechanisms, including analysis of the dataset and comparison to other datasets. The second set of rules may de-clutter the points interest by filtering and aggregating the points of interest by various mechanisms including the priority of the rule that created the point of interest. A display generator may create the visualization of the dataset along with various labels. In some embodiments, the display generator may allow real time user interaction with the data, which may include resizing the visualization in which the filtering and aggregation may be re-applied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
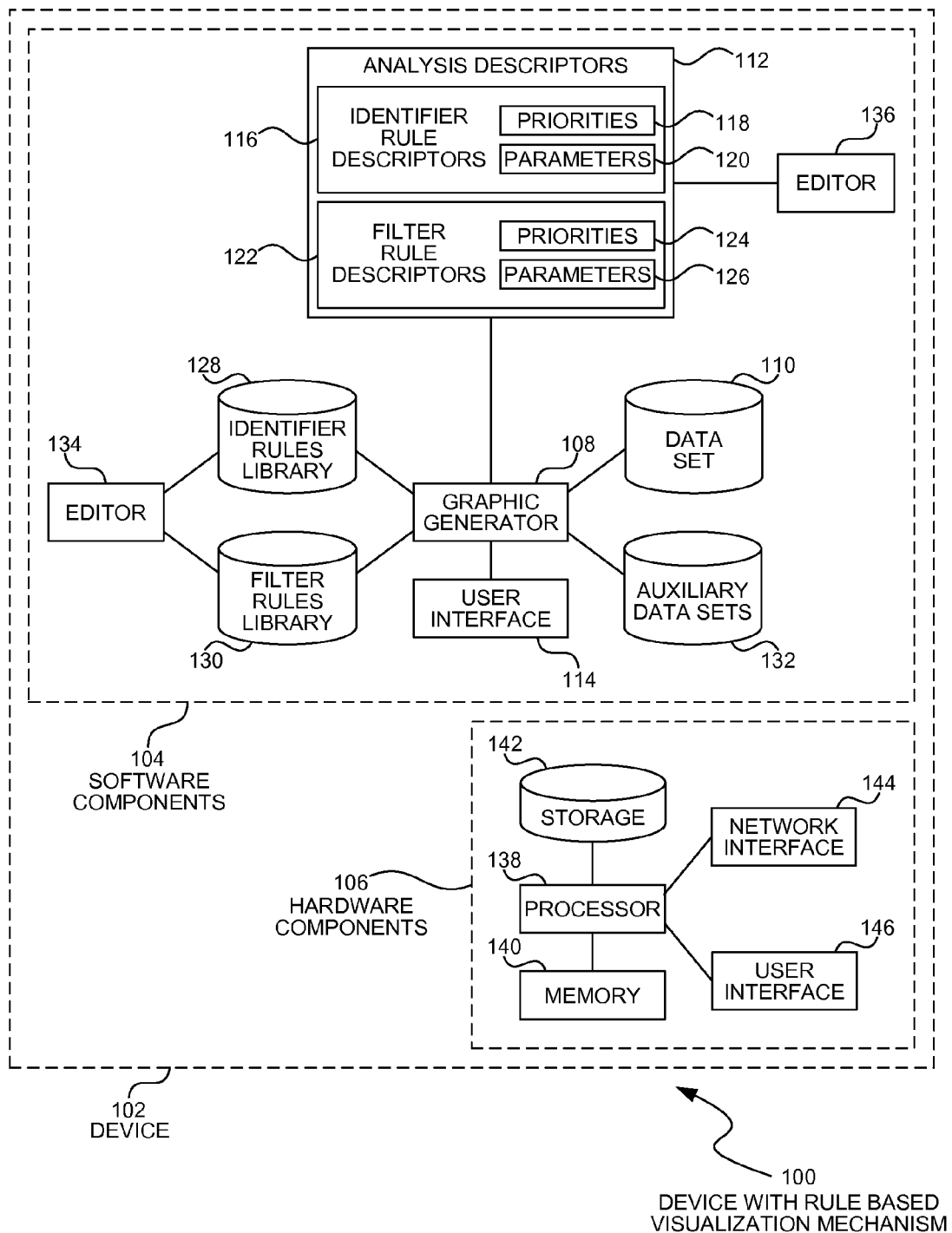
FIG. 1 is a diagram illustration of an embodiment showing a device with a rule based visualization mechanism.

A visualization mechanism may use sets of rules to find points of interest and provide labels or annotations to charts, graphs, or other illustrations. The first set of rules may identify points of interest, while the second set of rules may filter or aggregate the points of interest so that the illustration may be annotated or labeled in a visually appropriate way, taking into account the display parameters of the illustration.

The points of interest may be displayed as labels, highlighting, or other identifiers in statically displayed graphs or charts. In interactive displays, the points of interest may be used to generate hotspots, links, or other interactive elements that may be used to drill down into the data, provide other analysis, or cause other functions to be executed.

The visualization mechanism may create an illustration that is appropriate for the display configuration of the illustration. Larger displays may have higher number of labels or annotations, while smaller displays may have fewer labels.

The identifier rules may find points of interest by analyzing a dataset that will be displayed. In some cases, identifier rules may be dependent on other identifier rules. Some identifier rules may compare the dataset with other datasets, or use other external information to identify points of interest.

After identifying points of interest, a set of filter rules may be run to identify those points of interest that make sense for the display of the illustration. The filter rules may prioritize the various points of interest and remove lower priority points of interest. The filter rules may aggregate two or more points of interest created by the same or different identifier rules.

The visualization mechanism may be incorporated into databases, executable libraries, spreadsheet applications, websites, or other applications. In some embodiments, an interactive system may allow a user to select, modify, and edit various rules in real time, showing the results in a graphical user interface.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and may be accessed by an instruction execution system. Note that the computer-usable or computer-readable medium may be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" may be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a device with a rule based visualization mechanism. Embodiment 100 is a simplified example of a device that may apply sets of identifier rules and filter rules to create an annotated illustration such as a graph or chart.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a device that may use a rule based system that may analyze a dataset and create labels or other features for points of interest within the dataset. The system may be automated so that a given dataset may be illustrated with annotations that make sense for the desired analysis as well as the desired user interface or output. Embodiment 200 presented later in this specification illustrates a typical timeline graph that may be labeled or annotated using a rule based visualization system.

Embodiment 100 uses two sets of rules that may be applied to a dataset. The first set of rules may identify points of interest by analyzing the dataset, comparing the dataset to other datasets, or other analysis. The second set of rules may filter and aggregate the points of interest so that the labels or other elements are appropriately sized for the illustration.

Some rules may apply various statistical analyses, determine inflection points, analyze high and low points, determine deviation from regression or other curve fitting algorithm, or many other complex numerical analyses. Some rules may also add points of interest that correspond with other datasets, such as showing holidays, weekends, or other events in a timeline, or comparing the points of interest from another dataset with those of the analyzed dataset.

Some identifier rules may be dependent on other rules. In such cases, the output of a first rule may be used as input to a second rule. For example, a first rule may analyze the data to find a moving average of the data. The second rule may find crossover points where the dataset and the moving average cross.

When the identifier rules are executed, the points of interest may be created with various metadata. The metadata may include text or numerical labels for the point of interest, as well as visual items such as icons, colors, fonts, or other elements. In some embodiments, the metadata may include links to websites, applications, or other functions where additional or related information may be found.

The identifier rules may execute with a priority. The priority may be stored in the point of interest metadata and may be used by the filtering rules to select which points of interest may be shown and which may be discarded. The priority may be determined in part by a priority associated with the rule that created the point of interest. A high priority rule may be a rule that has points of interest that are important or more highly valued.

Each identifier rule may be assigned different priorities. Some embodiments may operate by forcing each rule to have a different priority. Many such embodiments may allow a numerical priority value to be defined. Some such embodiments may permit the identifier rules to be ordered in sequence or other implied or express priority arrangement. Other embodiments may allow two or more rules to share the same priority. Some such embodiments may have a high/medium/low priority assignment or some other grouping for identifier rules.

An identifier rule may assign a priority to different points of interest created by that rule. For example, a rule that identifies inflection points within a dataset may rank the inflection points within the dataset in order of priority. The priority may be defined by the inflection rule, for example, as proportional to the magnitude of the calculated inflection.

When an identifier rule assigns a point-level priority, each point of interest may also have a rule-level priority that comes from the rule that created the point of interest as well as a point-level priority established by the rule. The combination of the rule-level priority and point-level priority may be used to establish a general priority for the point of interest. Some embodiments may apply a point-level priority only, while other embodiments may use a rule-level priority only, and still other embodiments may use a combination of point-level and rule-level priorities.

Each embodiment may have different mechanisms for creating, calculating, and operating with priorities associated with identifier rules and points of interest. The priorities may be used by filtering and aggregation rules to determine which points are the most interesting when determining which points of interest to highlight in an illustration.

The filter rules may identify which points of interest to highlight in an illustration. The filter rules may use various display parameters to determine how many points of interest to highlight and which points of interest to highlight. The priority of the identifier rules and the points of interest may be used to identify interesting points of interest and to remove less interesting points of interest.

In some embodiments, the filter rules may aggregate two or more points of interest into a single point of interest. The points of interest may be points of interest created by the same identifier rule or different identifier rules. In some cases, a filter rule may aggregate two points of interest together and may keep all or some of the metadata from each point of interest. In other cases, a filter rule may aggregate two or more points of interest and may remove all of the points of interest except for one.

Aggregation may be used when two points of interest are near each other and may be difficult to adequately present visual labels on an illustration. Even though the points may be high priority, the points may add clutter to the illustration. By combining the two points, a label or other annotation may be created that reduces the clutter in the illustration and makes the illustration more visually appealing.

The visualization system may operate in many different forms and in different architectures and situations. In the form illustrated in embodiment 100, the visualization system may operate on a standalone device 102 such as a personal computer. In other embodiments, some elements illustrated in the device 102 may be performed by various devices connected by a network, including devices connected over the Internet or other wide area network.

Device 102 is illustrated as having software components 104 and hardware components 106. The device 102 is an architecture that may be similar to a personal computer, server computer, laptop computer, or any other computing device. In some cases, the device 102 may be a portable computer, netbook computer, portable telephone, personal digital assistant, handheld scanner, or any other device that can perform computing operations.

The software components 104 may include a graphic generator 108. The graphic generator 108 may analyze a dataset 110 using analysis descriptors 112 to generate an illustration on a user interface 114.

The analysis descriptors 112 may include identifier rule descriptors 116 that may include priorities 118 and parameters 120 for each identifier rule. Similarly, filter rule definitions 122 may include priorities 124 and parameters 126 for each filter rule.

When the graphic generator 108 executes, the analysis descriptors 112 may refer to various identifier rules and filter rules that may be stored in an identifier rules library 128 and a filter rules library 130, respectively.

The architecture of embodiment 100 is merely one example of how a rule based visualization system may be constructed. A set of analysis descriptors 112 may define which rules may be applied and how those rules may be applied to the dataset 110. The set of analysis descriptors 112 may be in the form of a text file, such as an XML file in some embodiments, and may be created and modified by an editor 136.

When the analysis is executed, the analysis descriptors 122 may be read and the corresponding rules loaded from a library and executed. Such an embodiment may be useful when the libraries 128 and 130 are distributed with an application or framework used by various applications. In such an embodiment, copies of the libraries 128 and 130 may be resident on the device 102 and called by multiple applications or used to analyze many different datasets.

In some embodiments, the libraries 128 and 130 may be components of a spreadsheet application, database application, or other application that may allow a user to display data in various forms. In such embodiments, the libraries 128 and 130 may be embedded functions within the application that may be called using dialog boxes or other user interface mechanisms. Some such applications may allow a separate definition of the analysis descriptors as illustrated in embodiment 100, while others may not.

Some embodiments may be extensible. Extensible embodiments may allow a user to create their own rules using an editor 134 or by writing and installing executable code, scripts, macros, or other function definitions. In some extensible embodiments, a set of predefined rules may be distributed with a language, operating system, application, or other group of executable code that may be used for multiple applications. A user may have a separate database of user defined rules that may be specific to a certain application and may or may not be shared with other applications.

One use scenario for the embodiment 100 is to create an analysis of a dataset that may be defined in the analysis descriptors 112 and apply the analysis to the dataset 110 as the dataset 110 is updated. For example, the analysis descriptors 112 may be created by a financial data analyst for viewing financial data in a company. The analysis descriptors 112 may be created to highlight trends and events within a company's cashflow, accounts receivables, or other financial data. A manager within the company may periodically review the dataset 110 that may be retrieved from an accounting database, and the graphic generator 108 may apply the analysis descriptors 112 to generate an annotated chart, graph, or other illustration on the user interface 114.

In such a use scenario, the analysis descriptors 112 may be created by the financial analyst using an editor 136 and saved as a document. The rules libraries 128 and 130 may be called by the graphic generator 108 each time the illustration may be created. Some such embodiments may provide the illustration to an end user, in this case the manager, without allowing the end user to change the settings of the various rules. Other embodiments may allow the end user to manipulate the analysis descriptors 112.

Another use scenario for embodiment 100 may be within a spreadsheet application. A user may have a dataset 110 that may be defined within the spreadsheet application. A charting or graphing function within the spreadsheet application may include dialog boxes or other user interface mechanisms that allow a user to select various identifier rules and filter rules to annotate the dataset within an illustration. Some embodiments may allow the user to adjust various parameters and priorities of the rules and may update the illustration dynamically in response to various adjustments. Such an embodiment may have the various software components 104 incorporated into a single application.

In still another use scenario, a website may create annotated illustrations. The website may have a database application that may generate a dataset 110. A web server may have a graphic generator 108 that may use a set of analysis descriptors 112 to analyze the dataset 110 and generate an annotated illustration. The annotated illustration may be created for viewing in a web browser on a client device.

In a network environment, the components illustrated in embodiment 100 may be performed on different hardware platforms. For example, a dataset 110 may be retrieved from a database server by a device executing the graphic generator 108.

In another example, a remote server may be configured with a graphic generator 108 and the rule libraries 128 and 130. A client device may transmit the dataset 110 and analysis descriptors 112 to the remote server, which may return an illustration to the client device.

The hardware components 106 may be typical of a general purpose computing device, but may include any type of device that can perform the functions of the software components 104. A processor 138 may have random access memory 140, as well as non-volatile storage 142. The processor 138 may also be able to access a network interface 144 and user interface 146.

Figure 2:
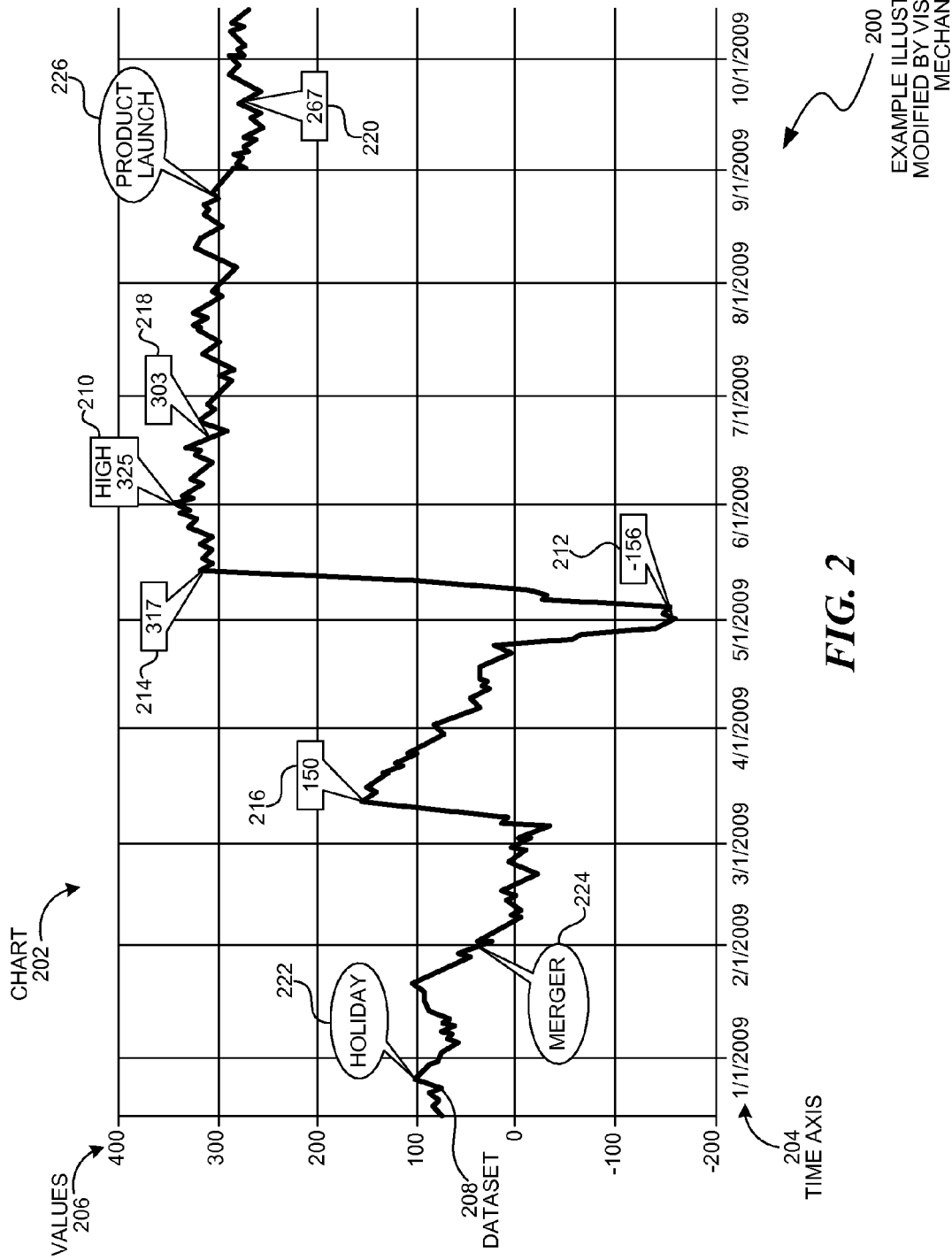
FIG. 2 is a diagram illustration of an embodiment showing an example of an illustration as modified by a visualization mechanism.

FIG. 2 is a diagram illustration of an example embodiment 200 showing an annotated illustration. Embodiment 200 is an example of a timeline dataset that has been annotated using different types of labels with different types of points of interest.

The chart 202 is an example of an illustration that may be created using a rule based visualization system, such as the system described in embodiment 100. The rule based visualization system may apply different types of rules to generate different points of interest. A set of filter rules may filter and aggregate the points of interest to identify appropriate points of interest based on the display characteristics of the output.

The chart 202 is presented with a time axis 204 and values 206. The dataset 208 is displayed as a timeline dataset. The dataset 208 may be analyzed using several different types of rules.

One rule may identify high and low values from the dataset. Such a rule may produce label 210, which indicates a high of 325 for the chart. The label 210 may have a text component, which is "HIGH" and a numerical component 325. The components of the label may be created by the rule during analysis.

Another rule that may identify inflection points in the dataset. Inflection points may be those points at which the data makes a large change in slope. Examples of inflection points may be labels 212, 214, and 216.

The label 212 may be identified as a point of interest by both the first rule and the second rule described above. Specifically, the point identified by label 212 may be a low value for the dataset as well as an inflection point. Because two rules identified a single point of interest, the filtering rules may combine the points of interest in different manners. In some cases, the filtering rules may permit two labels to identify the same point of interest.

In other cases, the filtering rules may combine certain parameters of one label with those of another. For example, the high and low rule may create labels that have a certain background color, while the inflection rule may create labels that have a specific font modifier, such as italic. A filtering rule may combine the two labels by making the label have the background color of the first rule with the font modifier of the second rule.

Labels 218 and 220 may be created by a third rule. The third rule may select points of interest that illustrate where a moving average or other dataset may cross the dataset 208. In some such rules, the other dataset may be calculated by the rule or imported from another source to perform a comparison.

The labels 222, 224, and 226 may be a different type of label created by a fourth rule. The fourth rule may compare the dates of the dataset 208 with a database that contains references to holidays or other events. In the case of label 222, a holiday may be indicated, while labels 224 and 226 may indicate a merger event or product launch event, respectively.

The example of embodiment 200 illustrates how several identifier rules may be used to find different points of interest from a dataset. The filtering rules may be used to pare down the points of interest into a displayable set of points of interest so that an illustration may be presented with relevant information but not be too cluttered or distracting.

The example of a timeline chart 202 is merely one example of an illustration that may be annotated. Any type of visual representation of data may be processed by a graphic generator, including timelines, bar graphs, line charts, pie charts, scatter graphs, area graphs, column charts, stock charts, surface graphs, doughnut charts, bubble charts, radar charts, map charts, and others.

Figure 3:
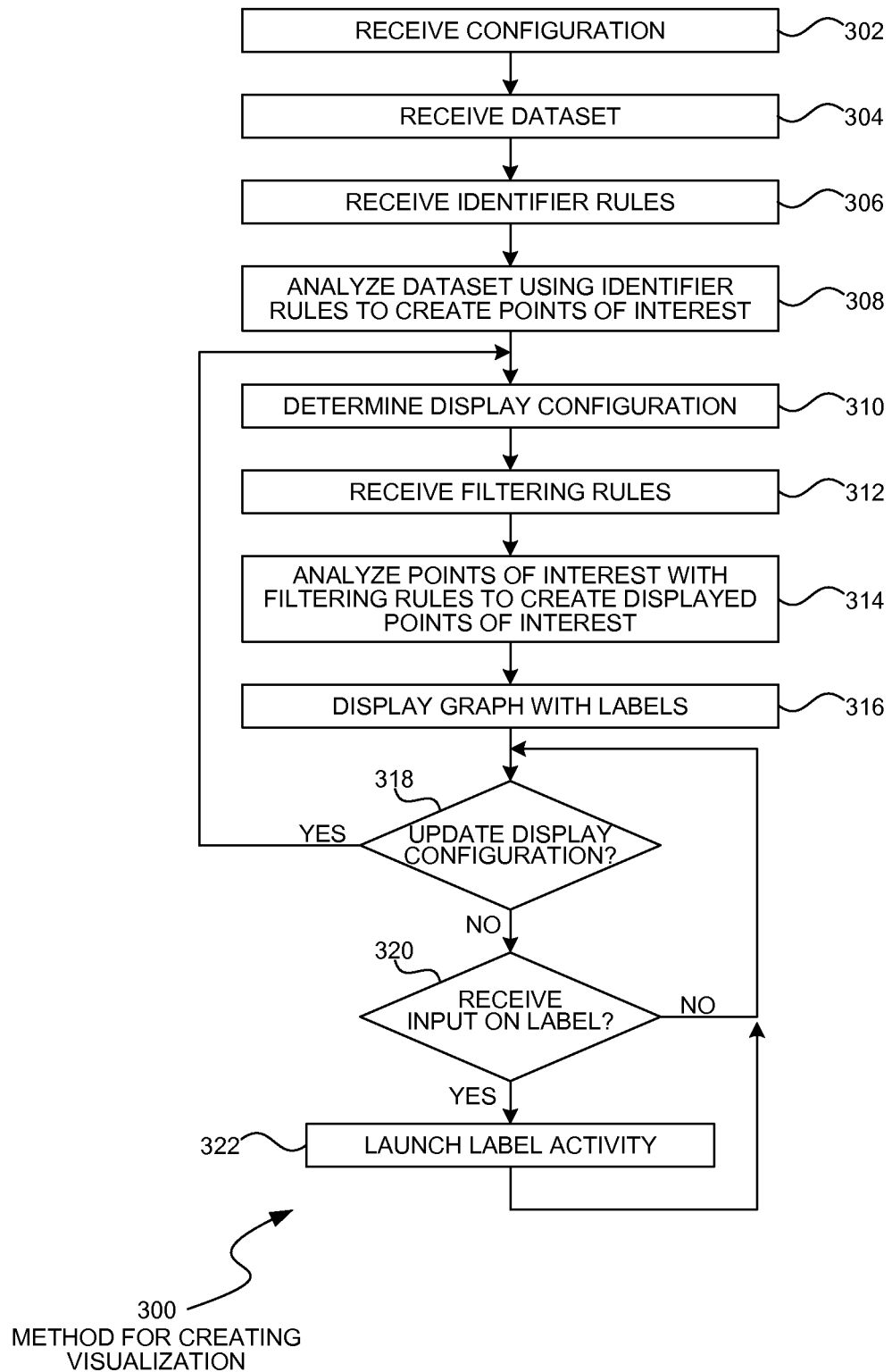
FIG. 3 is a flowchart illustration of an embodiment showing a method for creating a visualization.

FIG. 3 is a flowchart illustration of an embodiment 300 showing a method for creating a visualization. Embodiment 300 may be a high level process that may be performed by a graphic generator, such as graphic generator 108 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate the basic sequence of creating an annotated visualization of data. A set of identifier rules may select points of interest, and then a set of filter rules may select those points of interest that can fit into an illustration, based on the display characteristics. Embodiment 300 also illustrates some interactive elements that may be possible in some cases.

In block 302, a configuration may be received. The configuration may include a set of analysis descriptors, such as the analysis descriptors 112 of embodiment 100. The configuration of block 302 may include an identifier of a dataset, as well as identifiers for various rules.

The identifiers may be in the form of a Uniform Resource Identifier (URI) or other addressing scheme that may identify where a component may be located within a local system, a local area network, or a wide area network. In some cases, various libraries, rules, data sources, output devices, and other elements used by the embodiment 300 may be located remotely from the device on which the method of embodiment 300 is performed.

The dataset may be received in block 304. In some cases, the dataset may be retrieved from a database management system. In such cases, the configuration received in block 302 may include a query or other mechanism to connect to a database management system and retrieve the dataset.

The dataset may comprise any type of data, including numerical data, text data, or other types of data. Many embodiments may use a dataset that contains datapoints that have at least one dimension of numerical values. In some embodiments, the datasets may include one dimensional datapoints that may be arranged in a sequence, two dimensional datapoints, three dimensional datapoints, or other types of data.

The dataset may be analyzed in block 308 by the identifier rules to generate points of interest from the data. An example of a process performed by block 308 may be found in embodiment 400 presented later in this specification.

The process of analyzing the dataset may generate a large number of points of interest. Each point of interest may include a priority that may be used by the filtering rules to identify which points of data to keep and which to discard.

In block 310, the display configuration may be determined. The display configuration may include any parameter or option that may describe the intended output of the illustration. In many cases, the display configuration may include size parameters, such as a horizontal and vertical size of the illustration in pixels, inches, centimeters, or other dimension. In some cases, the size parameters may be a percentage of a screen size, window size, or other definition.

The display configuration may also include capabilities and options of an intended display device. For example, touchscreen capabilities, color display capabilities, tactile device capabilities, screen resolution, and other characteristics may be included.

The various display configuration parameters may be used by filter rules to select labels and annotations that are appropriate, and may also be used to change labels or other annotations to comply with the capabilities of the display device. For example, an output device with touchscreen capabilities may be presented with an illustration that has labels that are appropriately spaced and sized large enough so that a user may select the labels easily with a finger. When the same illustration may be presented on a non-touchscreen device, the illustration may be configured with smaller labels arranged differently.

The filtering rules may be received in block 312 and executed in block 314 to generate a set of displayed points of interest. An example of a process that may be performed for block 314 is presented later in this specification as embodiment 500.

The illustration may be displayed in block 316 with the labels.

In block 318, if a user updates the device configuration, the process may return to block 310 to re-process the points of interest with a different set of display configuration parameters. An example of such an action may occur when a user resizes the illustration.

In a spreadsheet use scenario, a user may dynamically resize a chart or graph by selecting a corner and dragging the corner to a different location. In such a use scenario, the embodiment 300 may return to block 310 and re-process the points of interest to create an updated chart with more or less labels, depending on how the chart was re-sized.

When the display parameters are changed in block 318 the process may return to block 310. In such embodiments, the identifier rules may not be executed again, but only the filter rules may be re-run. This may allow the illustration to be updated without having to wait for the potentially time intensive analysis of the identifier rules.

In block 320, a user may interact with a label and the label activity may be launched in block 322.

The actions of blocks 320 and 322 may be for embodiments where an illustration is presented on a graphical user interface and where the labels may be active components. The labels may be hotspots or have other user interface devices that a user may select. Based on the user selection, an activity defined in a label may be executed in block 322.

In embodiments with interactive features, such as blocks 320 and 322, the identifier rules and filter rules may define actions that may be performed by interacting with a label. For example, the actions may include launching an application, presenting additional information about the point of interest, changing the display to a particular website, or other action.

Figure 4:
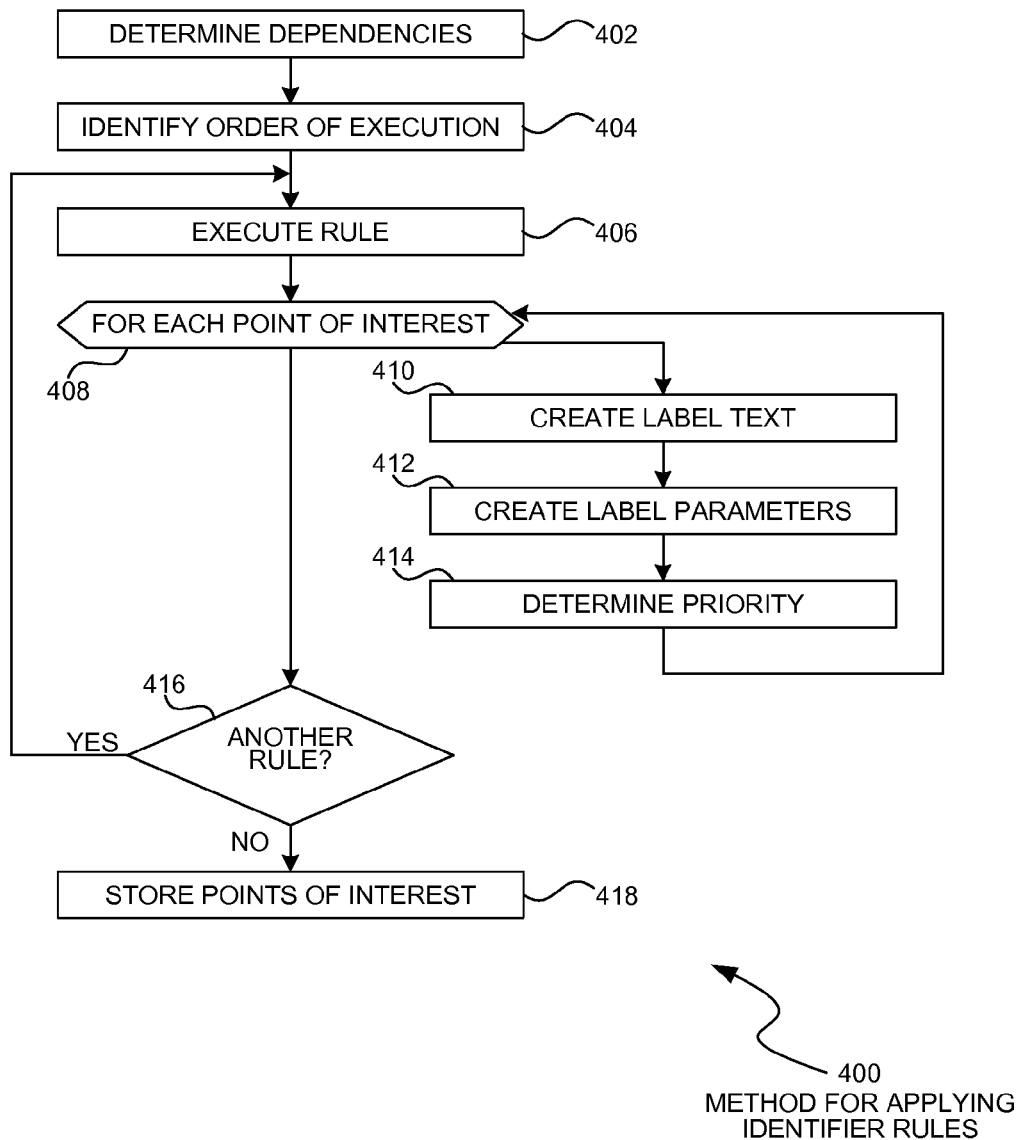
FIG. 4 is a flowchart illustration of an embodiment showing a method for applying identifier rules.

FIG. 4 is a flowchart illustration of an embodiment 400 showing a method for applying identifier rules. Embodiment 400 may be a detailed process for analyzing a dataset using several identifier rules, and may be a detailed process that may be performed for the block 308 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of embodiment 400 may apply several identifier rules to generate points of interest from a dataset.

In block 402, any dependencies within the set of identifier rules may be determined. Dependencies may include conditions where the output of a first rule may be used as input to a second rule. Such dependencies may define the order of execution for block 404.

The first rule in the order of execution may be executed in block 406.

Each point of interest created by the executing rule may be analyzed in block 408. For each point of interest, a label text may be created in block 410, label parameters may be created in block 412, and a priority may be determined in block 414.

The label text of block 410 may be text that may be displayed in a label on an annotated illustration. In some embodiments, a filter rule may later change or update the text. Some embodiments may include a short text that may be displayed on an illustration as well as detailed text that may explain the origin or significance of the point of interest. The detailed text may be displayed in interactive embodiments, for example, when a user clicks on or hovers over a label.

The label parameters of block 412 may include display parameters and non-display parameters. Display parameters may be parameters, for example, that define a color, font, font size, transparency, or other parameters that define how a label may be presented on a user interface. In some cases, the display parameters may include a label type, such as a balloon label, a cloud label, a label with text in a rectangle, icons used as labels or within labels, or other types of labels.

The priority of block 414 may be a priority defined by the executing rule. In many embodiments, each rule may be assigned a priority that may be applied to a point of interest created by the rule. Some embodiments may also assign a different priority to each point of interest created by that rule. In such embodiments, a point of interest may have a rule-level priority assigned to the rule, as well as a point-level priority assigned by the rule when the point of interest is created. Some embodiments may calculate a point of interest priority by multiplying, adding, or performing another calculation to determine a single priority value based on the point-level priority and the rule-level priority.

If another rule has not been processed in block 416, the process may return to block 406 to process the additional rule. If all of the rules have been processed in block 416, the points of interest may be stored in block 418.

Figure 5:
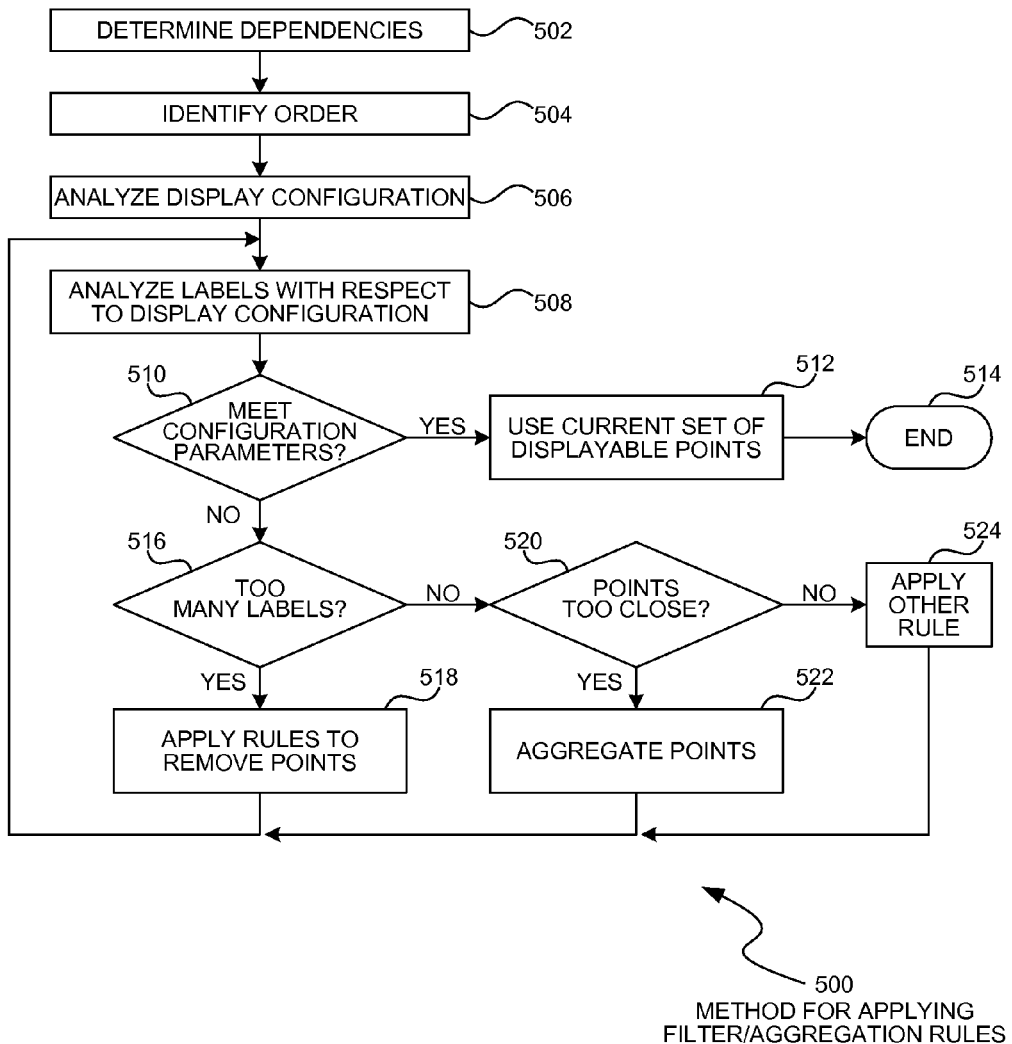
FIG. 5 is a flowchart illustration of an embodiment showing a method for applying filter rules.

FIG. 5 is a flowchart illustration of an embodiment 500 showing a method for applying filter rules. Embodiment 500 may be a detailed process for selecting displayable points of interest, and may be a detailed process that may be performed for the block 314 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 may apply filtering rules to a set of points of interest to remove or aggregate lower priority points of interest so that an illustration may conform to a given display configuration.

In block 502, any dependencies within the set of filter rules may be determined. Dependencies may include conditions where the output of a first rule may be used as input to a second rule. Such dependencies may define the order of execution for block 504.

In block 506, the display configuration may be analyzed to determine how labels or annotations may be presented.

In one embodiment, the size of the display may be used to determine a maximum number of labels. The maximum number of labels may be calculating a dimension of the illustration divided by a label size plus a spacing factor for the labels. A smaller display size may permit fewer labels, and a larger display size may permit more labels.

In some embodiments, the analysis of block 506 may identify an appropriate spacing for labels based on the size, resolution, or other factors of the display configuration. The spacing may be used by the filter rules to determine if two or more labels are too close.

The process of embodiment 500 may start with the set of displayable points of interest equal to the full set of points of interest. If the labels do not meet the display configuration, the process of embodiment 500 may remove one or more points of interest from the set of displayable points of interest. The process may iterate until all of the labels meet the criteria of the display configuration and the set of displayable points may be used.

In block 508, the labels may be analyzed to determine if the labels in the set of displayable points of interest meet the display configuration parameters of block 506. The analysis may define an appropriate spacing between labels, a maximum number of labels for the illustration, or other parameters that may be used to determine when the number of displayable points is appropriate for the display configuration.

If the configuration parameters are met in block 510, the current set of displayable points may be used in block 512 and the process may exit in block 514.

If the configuration parameters are not met in block 510, and there are too many labels in block 516, filtering rules may be applied in block 518 to remove points of interest. The filtering rules of block 518 may analyze the priorities of various labels to find low priority labels to remove from the set of displayable points of interest. The process may return to block 508 to iterate again.

If the configuration parameters are not met in block 510 and the configuration parameters are not too many labels in block 516 but are points of interest or labels that are too close in block 520, filter rules may be applied in block 522 to aggregate labels or select one label to represent the points of interest.

If the configuration parameters are not met in block 510 and the configuration parameters are not too many labels in block 516 nor are points of interest or labels too close in block 520, other rules may be applied to position, sort, or select labels.

The example of embodiment 500 merely illustrates one mechanism by which filter rules may be applied. Other embodiments may have different processes, different logic, and different mechanisms for applying filter rules to create a set of displayable points of interest from a set of points of interest while meeting a display configuration.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
receiving a first dataset comprising datapoints, each of said datapoints comprising a first coordinate, and wherein none of each of said datapoints has a predefined point of interest associated with each of said datapoints;
receiving a set of identifier rules, each of said identifier rules having a priority and capable of identifying points of interest from said dataset;
executing said identifier rules against said first dataset to generate a first set of points of interest;
determining a display configuration comprising at least one display size value;
receiving a set of filtering rules, each of said rules having a filtering priority and capable of identifying a subset of said points of interest meeting a filtering criteria, at least one of said filtering rules using said display configuration to determine at least a portion of said subset of said points of interest;
determining a set of displayed points of interest by executing said set of filtering rules against said first set of points of interest according to said filtering priority, said set of displayed points of interest being a subset of said first set of points of interest; and
creating a displayable illustration comprising a label for each of said displayed points of interest.

2. The method of claim 1, a first identifier rule being dependent on a second identifier rules.

3. The method of claim 2, said second identifier rule creating a first output, said first output being used as an input to said first rule.

4. The method of claim 1, at least one of said filtering rules performing an aggregation of a plurality of said points of interest into a single displayed point of interest.

5. The method of claim 4, said aggregation comprising determining a first priority for a first point of interest and a second priority for a second point of interest and selecting said first point of interest as said single displayed point of interest after determining that said first priority is greater than said second priority.

6. The method of claim 4, said aggregation comprising creating a label for said single displayed point of interest, said label comprising a first parameter defined by a first rule and a second parameter defined by a second rule, said first rule having defined a first point of interest and said second rule having defined a second point of interest, said first point of interest and said second point of interest being within said plurality of said points of interest.

7. The method of claim 1, said filtering comprising:
identifying a minimum spacing for a label based on said display configuration;
identifying a first point of interest created by a first rule and a second point of interest created by a second rule;
determining that said first point of interest and said second point of interest have a spacing less than said minimum spacing;
adding said first point of interest to said displayed points of interest after determining that said first priority is greater than said second priority.

8. The method of claim 1, said filtering comprising:
determining a maximum number of points of interest based on said display configuration; and
selecting said maximum number of points of interest from said first set of points of interest based on a priority for each of said filter rules.

9. The method of claim 1, at least a portion of said label being defined by at least one of said identifier rules.

10. The method of claim 9, said label comprising a value for said point of interest.

11. The method of claim 9, said label comprising a parameter derived from said dataset.

12. The method of claim 9, said label comprising a visual identifier.

13. The method of claim 12, said visual identifier being defined by one of said filter rules.

14. The method of claim 13, said visual identifier being defined in part by a priority of one of said rules.

15. A system comprising:
a processor;
an output device;
a graphic generator configured to perform a method comprising:
receiving a first dataset comprising datapoints, each of said datapoints comprising a first and second coordinate, and wherein none of each of said datapoints has a predefined point of interest associated with each of said datapoints;
receiving a set of identifier rules, each of said identifier rules having a priority and capable of identifying points of interest from said dataset;
executing said identifier rules against said first dataset to generate a first set of points of interest;
determining a display configuration comprising at least one display size value;
receiving a set of filtering rules, each of said rules having a filtering priority and capable of identifying a subset of said points of interest meeting a filtering criteria, at least one of said filtering rules using said display configuration to determine at least a portion of said subset of said points of interest;
determining a set of displayed points of interest by executing said set of filtering rules against said first set of points of interest according to said filtering priority, said set of displayed points of interest being a subset of said first set of points of interest;
creating a displayable illustration comprising a label for each of said subset of points of interest; and
causing said displayable illustration to be presented on said display device.

16. The system of claim 15 further comprising:
an identifier rule editor configured to select said set of identifier rules and define a priority for each of said identifier rules in said set of identifier rules.

17. The system of claim 16 further comprising:
a filter rule editor configured to select said set of filter rules and define a priority for each of said filter rules in said set of filter rules.

18. A method performed by a computer processor, said method comprising:
receiving a first dataset comprising datapoints, each of said datapoints comprising a first and second coordinate, wherein none of each of said datapoints has a predefined point interest associated with each of said datapoints;
receiving a set of identifier rules, each of said identifier rules having a priority and capable of identifying points of interest from said dataset;
executing said identifier rules against said first dataset to generate a first set of points of interest;
determining a first display configuration comprising at least one display size value;
receiving a set of filtering rules, each of said rules having a filtering priority and capable of identifying a subset of said points of interest meeting a filtering criteria, at least one of said filtering rules using said first display configuration to determine at least a portion of said subset of said points of interest;
determining a first set of displayed points of interest by executing said set of filtering rules against said first set of points of interest according to said filtering priority, said first set of displayed points of interest being a subset of said first set of points of interest;
creating a first displayable illustration comprising a label for each of said subset of points of interest;
presenting said first displayable illustration on a graphical user interface;
receiving a change to said display configuration from said graphical user interface, said change defining a second display configuration;
determining a second set of displayed points of interest by executing said set of filtering rules against said first set of points of interest according to said filtering priority, said second set of displayed points of interest being a subset of said first set of points of interest, said set of filtering rules being executed using said second display configuration;
creating a second displayable illustration comprising a label for each of said subset of points of interest; and
presenting said second displayable illustration on a graphical user interface.

19. The method of claim 18 further comprising:
receiving a modified parameter for one of said identifier rules;
executing said identifier rules against said first dataset to generate a second set of points of interest, said executing being performed with said modified parameter;
determining a third set of displayed points of interest by executing said set of filtering rules against said first set of points of interest according to said filtering priority, said third set of displayed points of interest being a subset of said first set of points of interest;
creating a third displayable illustration comprising a label for each of said subset of points of interest;
presenting said third displayable illustration on a graphical user interface.

20. The method of claim 18 further comprising:
receiving an input from said graphical user interface, said input selecting a first label; and
causing an action to be performed, said action being defined within said first label.

* * * * *